United States Patent [19]

Juravic

[11] Patent Number: 4,614,489

[45] Date of Patent: Sep. 30, 1986

[54] SIMULTANEOUS EXTRUSION OF MULTIPLE STREAMS OF A FIBROUS FOOD PRODUCT

[75] Inventor: Davor Juravic, San Pedro, Calif.

[73] Assignee: Star-Kist Foods, Inc., Terninal Island, Calif.

[21] Appl. No.: 689,284

[22] Filed: Jan. 7, 1985

[51] Int. Cl.$^4$ ............................................. A22C 7/00
[52] U.S. Cl. .................................. 425/376 R; 17/32; 425/378 R; 425/382 R; 425/464; 426/513; 426/516; 264/169
[58] Field of Search ............... 425/130, 131.1, 131.5, 425/192 R, 376 R, 376 A, 378 R, 379 R, 382 R, 516, 464, 463; 17/32; 426/513, 516; 264/103, 108, 237, 169

[56] References Cited

U.S. PATENT DOCUMENTS

| | | | |
|---|---|---|---|
| 1,947,541 | 2/1934 | Wengel | 425/131.1 |
| 2,244,854 | 6/1941 | Sandin | 425/192 |
| 2,461,291 | 2/1949 | McKee | 99/159 |
| 2,521,849 | 9/1950 | Hopkins | 99/194 |
| 2,771,366 | 11/1956 | Shadid | 426/513 |
| 3,432,311 | 3/1969 | Gruner | 99/208 |
| 3,568,251 | 3/1971 | Walker | 425/378 R |
| 3,664,849 | 5/1972 | Autry | 99/107 |
| 3,834,849 | 9/1974 | Supran et al. | 426/513 |
| 3,934,050 | 1/1976 | Hawkins | 426/513 |
| 4,104,958 | 8/1978 | Manser et al. | 425/382 R |
| 4,171,688 | 10/1979 | Ratcliffe | 99/450.1 |
| 4,195,489 | 4/1980 | Bernard | 62/63 |
| 4,205,415 | 6/1980 | Orchard | 425/298 |
| 4,207,281 | 6/1980 | Bernard | 426/513 |
| 4,268,532 | 5/1981 | Bernard | 426/516 |
| 4,332,823 | 7/1982 | Buemi | 426/272 |
| 4,338,702 | 7/1982 | Holly | 17/32 |
| 4,371,558 | 2/1983 | Siregar et al. | 426/332 |
| 4,384,009 | 5/1983 | Lewis et al. | 426/646 |
| 4,430,356 | 2/1984 | Ohyabu et al. | 426/574 |
| 4,535,505 | 8/1985 | Holly et al. | 426/516 |

Primary Examiner—Jay H. Woo
Assistant Examiner—J. Fortenberry
Attorney, Agent, or Firm—Fulwider, Patton, Rieber, Lee & Utecht

[57] ABSTRACT

Apparatus for the simultaneous extrusion from an extrusion discharge station of multiple streams of a food product having fibers therein, from a single mass of the food product, where the desired product spacing between the streams at the extrusion discharge station is less then the greatest expected fiber length. Converging extrusion channels communicate at a channel entry station with a feed container which holds and directs the flow of the mass of food product, and the distance of closest spacing between the extrusion channels at the channel entry station is greater than the average expected fiber length. Bridging of food fibers between adjacent extrusion channels at the entry station is avoided by the large channel entry spacing, while the decreasing distance between the converging channels allows the food product streams at the extrusion discharge station to be spaced at a desired product spacing less then the greatest expected fiber length. Uniform flow of the food mass into the channel entry station is promoted by the use of a converging/diverging flow path in the feed container.

13 Claims, 7 Drawing Figures

SIMULTANEOUS EXTRUSION OF MULTIPLE STREAMS OF A FIBROUS FOOD PRODUCT

BACKGROUND OF THE INVENTION

This invention relates to food processing machinery, and, more particularly, to apparatus for extruding multiple streams of food products having fibers therein.

The extrusion of food products is an important technique for transforming a single mass of food product into multiple smaller pieces for further processing and eventual packaging for sale to consumers. In commercial production operations, some food products are most conveniently and economically prepared in a large mass, and the mass is then divided into smaller portions for subsequent processing. After initial preparation, the mass of food product is placed into a container having one or more extrusion ports, and the food mass is pressurized. Streams of the food product emerge through the ports and may be cut into shorter lengths.

Extrusion has been applied to the preparation of simulated jerky products such as strips of dried meat, particularly for use as pet foods. In preparing such a jerky product, a meat-containing mixture having a relatively high moisture content is mixed and then placed into an extrusion container, and a single stream of the meat mixture is extruded as a strip onto a supporting surface. The supporting surface with the strip of extruded meat mixture thereon is placed into a drying oven to dry the jerky by removing a major portion of the moisture, and the jerky is then cut into short lengths for packaging.

In the past, it has been known to extrude single strips of such a meat-containing product mixture onto a supporting surface, but it would be desirable to extrude multiple strips spaced closely together onto a supporting surface, to utilize the area of the supporting surface most effectively in the drying ovens. The extrusion of multiple strips of fibrous meat products having small spacings between adjacent strips has not been possible because of the fibrous content of the meat mixture. Even when processed, meat mixtures often contain meat fibers having lengths as great as about 1-2 inches. If multiple extrusion ports to the channels are placed closely together in the feed container, the long meat fibers can bridge over the wall between the adjacent extrusion channels at the ports, with the result that there is a buildup of fibrous material at the ports. This buildup rapidly leads to clogging of the extrusion channels at this station, and the apparatus must be shut down for cleaning. Extended and repeated downtime for cleaning essentially nullifies the advantages to be obtained from extrusion and particularly from the simultaneous extrusion of multiple product streams.

Additionally, it is necessary that the mass flow rate through each of the multiple channels be substantially the same. Otherwise, the final jerky product of different extrusion strips would have different densities and weights, an undesirable result for a mass-produced food product. If multiple ports are cut into a conventional feed container, wide variations are found in the weights of the final products discharged through various ports. There has been proposed no design for an extrusion apparatus which would allow extrusion of multiple, substantially identical, food product streams.

There thus exists a need for an apparatus to allow the simultaneous extrusion of multiple product streams of a food product containing lengths of fiber therein. While this need is most acute for the extrusion of meat products, preparation of other food products such as fibrous vegetable products also require such apparatus.

The difficulties in extruding multiple streams of a fibrous food mass have previously been recognized, as for example in U.S. Pat. No. 4,338,702. This patent describes an apparatus for forming a series of ground meat patties, with each patty formed by simultaneous extrusion of multiple plugs of a mass of meat product containing fibers. The apparatus described in the U.S. Pat. No. '702 patent forwardly extrudes a plurality of plugs from an extrusion chamber into a forming chamber, and then introduces a new mass of meat product into the extrusion chamber after the previously formed patty is moved out of the forming chamber. By the nature of the process, the meat extrusion function is periodically repeating rather than continuous. The specification of the U.S. Pat. No. '702 patent refers to the problem of the bridging of the meat fibers and buildup of fibrous meat mass. To solve the problem of the extrusion of multiple streams of the fibrous meat product, the U.S. Pat. No. '702 patent teaches (at col. 15) the loading of the next mass of food product in a reverse manner from the forming chamber through the extrusion channels and into the extrusion container. It is said that such reversing action wipes away the meat fibers bridging between the adjacent channels, thereby preventing fiber buildup. While this approach is said to be successful in accomplishing periodic extrusion, it obviously cannot be used for continuous extrusion operations, because the forward extrusion of the food mass into continuous multiple streams cannot be interrupted to load new product into the extrusion chamber in a reverse manner. Thus, while the problem of achieving multiple simultaneous extrusion of streams of food product from a fibrous food mass has been recognized and solved for one type of periodic extrusion, there has been proposed no approach which would allow continuous extrusion of such fiber-containing products.

Accordingly, there exists a need for an apparatus for performing the simultaneous, continuous extrusion of multiple, substantially identical streams of a food product from a single mass of the food product, where the food product has fibers therein whose greatest expected fiber length is greater than the minimum desired product spacing between the extruded streams of food prduct. The present invention fulfills this need, and further provides related advantages.

SUMMARY OF THE INVENTION

The present invention resides in an apparatus for extruding continuous multiple, substantially identical streams of a food product having fibers therein. The apparatus allows the extruded streams to be positioned closely together as they are discharged from the extrusion apparatus, and specifically the streams may be spaced more closely than the greatest expected fiber length of the fibers contained within the food mass. The construction of the apparatus prevents the clogging of the extrusion channels due to the bridging of fibrous matter between adjacent channels as the food product enters the channels. Multiple product streams may be extruded onto a support surface in a closely spaced relationship, which allows maximum coverage of the supporting surface and the most efficient use of subsequent processing machinery.

In accordance with the invention, apparatus for the simultaneous extrusion, through an extrusion discharge station, of at least two streams of a food product from a single mass of the food product, the food product having fibers therein with an average fiber length and a greatest expected fiber length, comprises container means for containing the mass of the food product and at least two extrusion channels communicating with said container means at a channel entry station, each channel having a spacing from all other channels at the channel entry station of greater than the average fiber length, the channels being convergently arranged so that the distance between the channels at the extrusion discharge station is the desired product spacing. Spacing the entry to the extrusion channels, at a distance greater than the average fiber length prevents a buildup of fibers bridging between adjacent channels and thereby prevents clogging of the apparatus by fiber masses. The channels may be structured to have a decreasing cross-sectional area with increasing distance from the channel entry station toward the extrusion discharge station, and they also may incorporate a changing cross-sectional shape from the channel entry station toward the extrusion discharge station. Further, the channels may be heated to prevent sticking of the food product within each individual channel.

In another aspect of the invention, a uniform flow of food product to the respective channels is achieved by including a convergence section and a divergence section in the container means, so that food product flows continuously from an inlet port through the convergence section, then through the divergence section, and thence to the channel entry station. The convergence section joins the divergence section at a pressure station, and the diverging flow from the pressure station produces a substantially uniform flow of the food mass to each of the extrusion channels.

A preferred embodiment of the apparatus is utilized for extruding multiple streams of a meatcontaining mixture to form strips on a supporting surface. Pieces of animal meat and tissue such as animal muscle meat and animal organs are ground and then mixed together in a double ribbon mixer for about 15 minutes, to achieve a generally homogenous meat mixture. Upon detailed examination of the meat mixture, it is found that, despite the comminution procedure, meat fibers having a greatest expected length of about 2 inches, with an average length of about 1 inch, are found in the mixture. Accordingly, the apparatus of the preferred embodiment is provided with a closest spacing between adjacent channels at the channel entry station of greater than about 1 inch, and preferably at least about 2 inches. The channels converge both in spacing and cross-sectional area, as well as experience a change in shape over their lengths. At the channel entry station, each channel is circular in cross-section with a diameter of about 1 inch and spaced from the nearest adjacent channel by at least about 2 inches. At the extrusion discharge station the channels are generally rectangular in cross-section with a height of about 0.165 inches, a width of about 1.24 inches, and a spacing between channels of about 0.25 inches. In this preferred apparatus, there are sixteen channels arranged into four groups of four channels each, with the channels arranged in two parallel rows at the channel entry station, and lying in a single plane at the extrusion discharge station. The apparatus allows the continuous extrusion of four streams onto each of four separate trays, each tray being about 6 inches wide, thereby allowing a high degree of packing of the strips onto the trays without overlap. This high product packing density in turn allows maximum utilization of space when the filled trays are placed into the drying apparatus.

It will be appreciated from the foregoing that the present invention represents an advance in the field of food processing by extrusion. Food products containing fibers may be extruded as multiple streams from a single mass contained within a single container. Clogging of the multiple extrusion channels as a result of the fibrous nature of the food product is prevented, thereby allowing continuous extrusion and maximum packing density of the extruded product on the support surface. Other features and advantages of the present invention will be apparent from the following more detailed description, taken in conjunction with the accompanying drawings, which illustrate a preferred embodiment of the invention.

DETAILED DESCRIPTION OF THE PREFERRED EMBODIMENT

Figure 1:
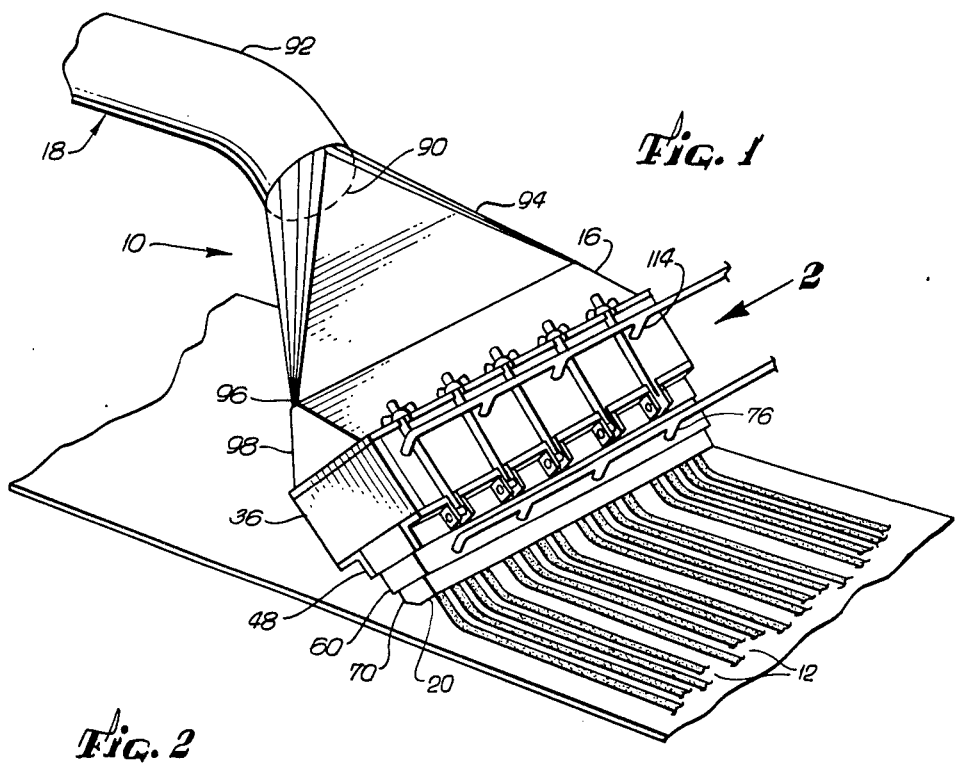
FIG. 1 is perspective view of a preferred extrusion apparatus.
Figure 2:
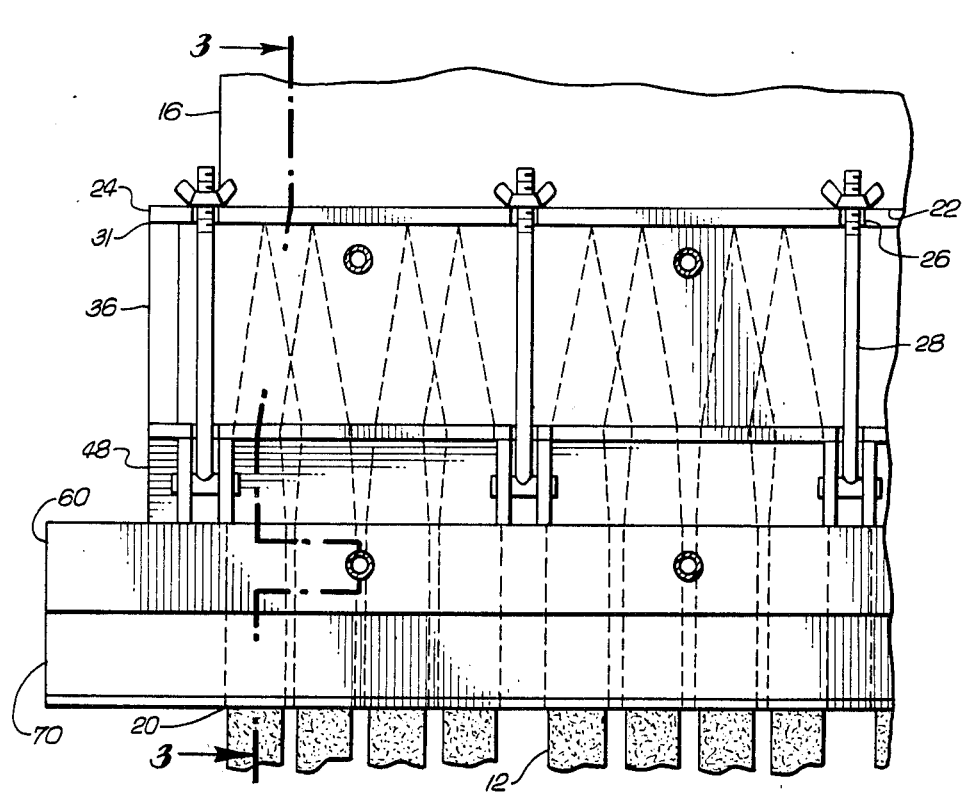
FIG. 2 is a top plan view of the apparatus of FIG. 1, taken generally in the direction of the arrow 2.

A preferred embodiment of the invention, illustrated in FIGS. 1–7, is used for the simultaneous extrusion of sixteen strips of a meat-containing mixture, the sixteen strips being arranged as four groups of four strips each. Each strip is desirably about 1.24 inches in width, 0.165 inches in height and of indefinite length. All sixteen strips are coplanar in the plane defined by the broad face of the strips, so that the strips may be extruded onto four trays lying in a side-by-side fashion, each tray being about six inches wide. Within each group of four strips, the longitudinal spacing between adjacent strips is desirably about 0.25 inches, and the longitudinal spacing between each group of four strips is desirably about one inch.

An operable and preferred meat mixture is prepared by mixing together the following ingredients, with the stated percentages by weight: 75% meat by-products, 15% beef, 1% wheat flour, 1% cane molasses, 2% dextrose 2% salt, 2% water, and 2% spices and preservatives, in an industrial scale mixing apparatus such as a double ribbon mixer for a period of about 15 minutes. The resulting mixture has a sufficiently high viscosity that the extruded meat strips hold their shapes when extruded upon the supporting surface trays. Preferably, the mixing procedure is not so extensive and so violent that the natural meat fibers are broken or cut into short lengths. It is desirable in the final commercial product that meat fibers be visible when the dry product is broken open, to simulate the appearance of natural meat jerky. These meat fibers are typically from about one-quarter inch to about two inches in length with an average length, determined by inspection, of about one inch.

For the reasons described, it has previously been impossible to achieve simultaneous continuous extrusion of multiple strips containing such fibers, where the strips are to be positioned closely together, as the meat fibers clog the entrances to the extrusion channels. The dimensions and ingredients described above are illustrative of the product specifications and food product mass which may be processed using the apparatus of the present invention. However, the present invention is not so limited.

In accordance with a preferred embodiment of the present invention, an apparatus 10 extrudes a plurality of streams 12, preferably in the form of strips, from a single mass 14 of the food product contained within a container 16. The mass of food product 14 is supplied from a supply device 18 and emerges from the apparatus 10 at an extrusion discharge station 20.

The container 16 comprises an elongated hollow manifold having an elongated transverse face 22 closed with a container closure plate 24. The food mass 14 within the container 16 may be pressurized by any suitable means, and is preferably pressurized simply by the continued introduction of additional food product into the container 16 from the supply device 18. In the preferred embodiment, the extrusion pressures are relatively small, being on the order of about 10-30 pounds per square inch (psi), and this relatively low pressure may be readily supplied by many types of supply devices. In other embodiments, it may be preferable to apply high pressures, as by apparatus such as pistons or extruder screws.

The container 16 includes an inlet port 90 which is supplied with the mass of food product through a pipe 92 from an external source (not shown). The portion of the container 16 adjacent the inlet port 90 is a convergence section 94, wherein the cross-sectional area through which the food product mass flows is reduced. The convergence is achieved by reducing the internal dimension of the section 94 to the direction of elongation of the face 22, while increasing the internal dimension parallel to the direction of elongation to supply food product across the entire width of the face 22. The pressure within the food product mass is thereby increased. The convergence section 94 ends at a pressure station 96, and is there joined to a divergence section 98, wherein the food mass is distributed outwardly to the extremities of the container closure plate 24. The convergence/divergence approach aids in achieving a substantially uniform distribution of food product in all of the strips of food at the extrusion discharge station 20.

In the most preferred apparatus, the inlet port 90 is a circular opening having a diameter of about 6 inches. The convergence section 94 is a hollow, tapered stainless steel sheet metal structure having a 6-inch diameter inlet end welded to the inlet port 90, and gradually tapering over a length of about 14 inches to a rectangular cross section about 26 inches wide and ½ inch high, at the pressure station 96. In the stainless steel sheet metal divergence section 98, the width of about 26 inches is maintained, but the height is increased from about ½ inch at the pressure station 96 to about 5 inches, adjacent the container closure plate 24, over a length of about 4 inches. These preferred dimensions were chosen for consistency with the dimensions of the adjacent portions of the apparatus 10, and are not limiting of the apparatus 10.

The container closure plate 24 is an elongated plate completely covering the elongated transverse face 22, and having bolt locator cutouts 26 for receiving swing bolts 28. The transverse face of the container closure plate 24 has cut therethrough an opening 30. The opening 30 extends completely through the container closure plate 24, and the plane of the container closure plate 24 facing outwardly and away from the container 16, and immediately adjacent the exit ports 30, defines a channel entry station 31. When the food mass 14 within the container 16 is pressurized, food flows outwardly through the opening 30.

The single mass of food product emerging through the opening 30 is divided into a plurality of coplanar streams in a confluence section 36. The confluence section 30 first forms a plurality of non-coplanar streams and then brings the streams to a coplanar arrangement. The confluence section 36 is preferably a solid block of material having a plurality of channels 38 bored therethrough. At the entry face 40 of the confluence section 36, extrusion ports 39 of the channels 38 communicate with the opening 30. Food product may therefore flow from the opening 30 into the extrusion ports 39 of the channels 38 under pressure. The extrusion ports 39 and channels 38 are arranged in two rows of eight channels each at the entry face 40, in this preferred embodiment, to provide for an increased spacing between the streams at this face.

Figure 4:
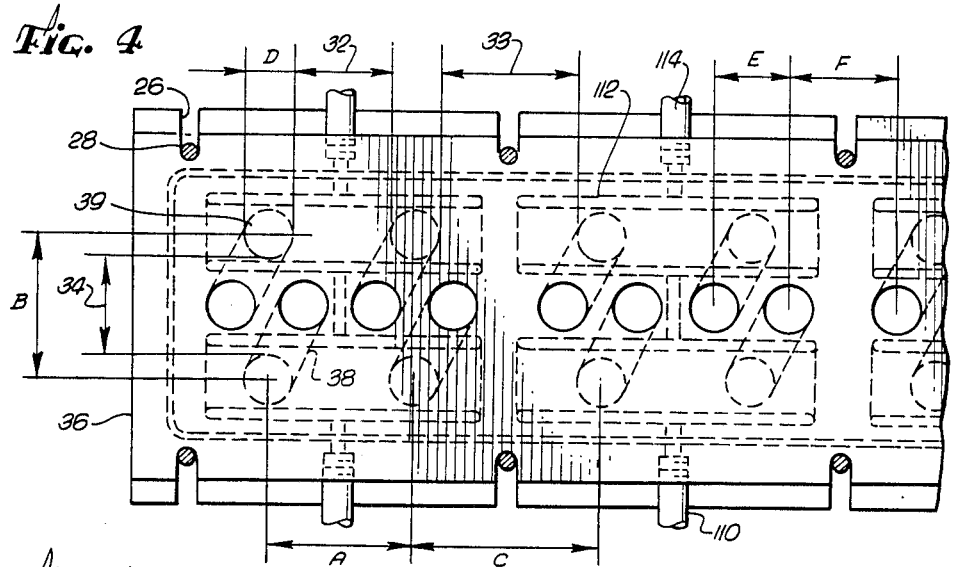
FIG. 4 is a cross sectional view of the apparatus of FIG. 3, taken generally on line 4—4.
Figure 5:
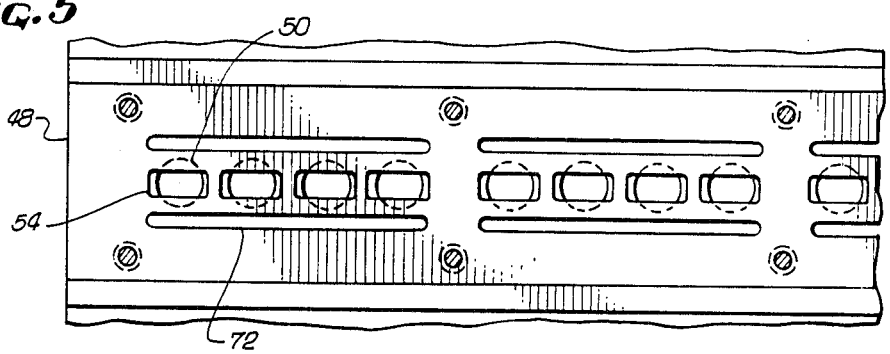
FIG. 5 is a cross sectional view of the apparatus of FIG. 3, taken generally on line 5—5.

In the confluence section 36, the channels 38 converge from two rows of eight channels each to a single coplanar row of sixteen channels, as illustrated in FIG. 4. To achieve this convergence, the upper row of channels 38, as viewed in FIG. 4, may be considered as being bored to angle downwardly and to the left, while the lower row of channels 38 may be considered as being bored to angle upwardly and to the right. The channels 38 of the upper row are bored parallel to each other, and the channels 38 of the lower row are bored parallel to each other, so that the channels retain an arrangement of four groups of four each. In the preferred embodiment, the channels 38 are initially of circular cross section with a diameter of about one inch. At an exit face 42 of the confluence section 36, the channels 38 remain circular in cross section of diameter of about one inch, but are arranged in a single row.

In the preferred embodiment, the extrusion ports 39 have a circular cross sectional configuration with a diameter D. In the most preferred embodiment, the diameter D is about one inch. The extrusion ports 39 of the preferred embodiment are arranged in four groups of four ports 39 each, with each group including two ports 39 each in the upper and lower rows. In each of the upper and lower rows, a center-to-center distance A of the channel entry ports 39 is preferably about three inches, so that a lateral spacing 32 within each group is about two inches. The center-to-center spacing B between the extrusion ports 39 located in the top row and the extrusion ports 39 located in the bottom row is preferably about three inches, so that a row spacing 34 is about two inches. Although the lateral spacing 32 and the row spacing 34 are chosen in the preferred embodiment to be equal, they need not be so. The center-to-center spacing C between neighboring channel entry ports 39 in different groups in preferably chosen to be about 3¾ inches, so that a group spacing 33 is about 2¾ inches.

These spacings 32, 33, and 34 must be greater than the average fiber length found in the food mass 14, to prevent food fibers from extending across the spacings 32, 33, and 34. If such bridging were to occur, then constricting and plugging of the bridged extrusion ports 39 is expected. In the food mass described previously, a comminuted meat mixture, the average fiber lengths were observed to be about one inch, and the spacings 32, 33 and 34 are therefore chosen to be greater than one inch. Since the longest fibers typically observed are about two inches in length, in a particularly preferred embodiment the spacings 32, 33 and 34 are chosen to be at least two inches in length, so that even the longest fibers cannot bridge over the spacing between adjacent extrusion ports 39. The shortest distance as between the spacings 32, 33 and 34 defines the nearest spacing of the extrusion ports 39 in the illustrated embodiment, and it is the smallest of these three values which should be greater than the average fiber length in the preferred embodiment, and the greatest expected fiber length in the most preferred embodiment. If other arrangements of the extrusion ports 39 are chosen, then the nearest spacing of those exit ports would be chosen to be greater than the average or greatest expected fiber length of the extruded food product. Although an occasional fiber in the food mass 14 may have a length greater than the nearest spacing of the entry ports, it has been observed that such infrequent fibers do not cause bridging and clogging of the extrusion ports 39.

At the exit face 42, the channels 38 are arranged into four groups of four channels each, all of the channels being coplanar, with the center-to-center distance E within each group about 1½ inches and center-to-center spacing F between groups being about 2¼ inches.

The food product flows from the channels 38 at the exit face 42 of the confluence section 36 into corresponding and communicating channels 44 at the entry face 46 of a reshaping section 48. The cross-sectional shapes, sizes, and arrangement of the channels 44 at the entry face 46 correspond with the shapes, sizes and arrangement of the channels 38 at the exit face 42, so that food product may smoothly flow from the channel 38 into the channel 44. As illustrated by the solid and phantom lines of FIG. 5, the initially circular channels 44 are altered in cross section over the length of the reshaping section 48 to have a generally rectangular cross section, the rectangles having rounded corners. The cross section of the channels 44 at the entry face 46 is indicated by the numeral 50, and the channel cross section of the channels 44 at an exit face 52 of the reshaping section 48 is indicated by the numeral 54. It is preferred that the transition in cross sections occur over a continuous or smoothly blended surface of the channel 44, to avoid the possibility of accumulations of food product at corners or edges that might cause blockages.

Figure 6:
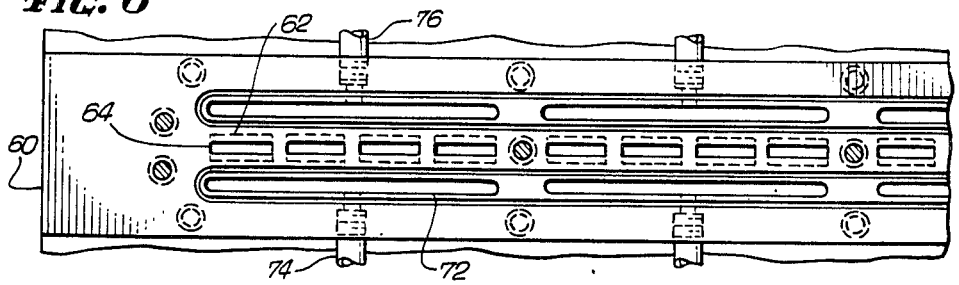
FIG. 6 is a cross sectional view of the apparatus of FIG. 3, taken generally on line 6—6.
Figure 7:
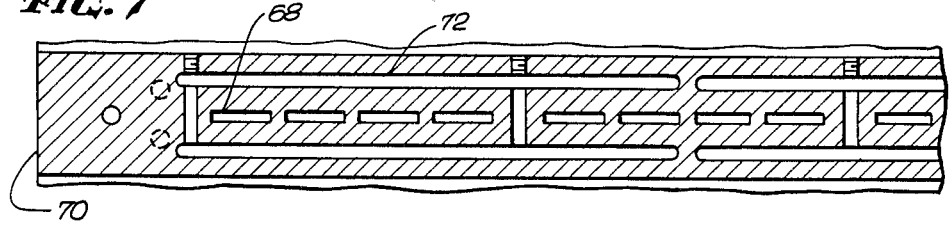
FIG. 7 is an end elevational view of the apparatus of FIG. 3, taken generally on line 7—7.

Food product flows from the channels 44 at the exit face 52 of the reshaping section 48 into communicating and corresponding channels 56 at an entry face 58 of a reducer section 60. The cross-sectional shapes, size, and arrangement of the channels 56 at the entry face 58 correspond with the shapes, sizes, and arrangement of the channels 44 at the exit face 52, so that food product may smoothly flow from the channels 44 into the channels 56. In the reducer section 60, the thickness of the channels 56 is reduced, as illustrated in FIG. 6, from the shape indicated by numeral 62 at the entry face 58, to the shape indicated by the numeral 64 at an exit face 66 of the reducer section 60.

The food product flows from the channels 56 into communicating and corresponding channels 68 of an extruder plate 70. The cross-sectional shapes, sizes, and arrangement of the channels 68 correspond with the shapes, sizes and arrangement of the channels 56 at the exit face 66, so that the food product may smoothly flow from the channels 56 into the channels 68. Upon reaching the extrusion emergence station 20 of the extruder plate 70, the food product in the channels 68 emerges from the apparatus 10 as a plurality of streams 12 having the desired cross-sectional shape and spacing, and being of indefinitely long length, as the extrusion is continuous.

As the food product in the food mass 14 is continuously forced forwardly from the container 16 successively into the confluence section 36, reshaping section 48, reducer section 60 and extruder plate 70, the cross sections of the tubular channels 38, 44, 56, and 68 are reshaped from circular to plate-like, and the cross-sectional area of the channels is reduced. Moreover, the minimum spacing between the channels is reduced from a value which is greater than the average and expected greatest fiber lengths in the food product, at the channel entry station 31, to a value which is less than the greatest expected fiber length in the food product. The geometric reduction thus achieved by the apparatus 10 accomplishes the coplanar extrusion of multiple strips of food product, the strips having a spacing less than the greatest expected fiber length. This result could not be accomplished without plugging of the channels, if the channels 38 were to be spaced apart by a dimension substantially less than about the average fiber length at the channel entry station 31.

It is further noted that the sectional construction of the apparatus 10, wherein the various sections 36, 48, 60 and 70 are produced as separate units, allows considerable variety in the selection of extrusion parameters. For example, if it were desired to extrude shapes other than the flat strips of the presently preferred embodiment, then it would not be necessary to remachine the convergence section 36, only the extruder plate 70, the reducer section 60, and possibly the reshaping section 48. The sectional construction also allows the replacement of individual portions of the apparatus 10 which experience significant wear during use.

It is preferred that the container 16, reducer section 60 and extruder plate 70 all be machined or otherwise formed from 304 stainless steel, which has sufficient strength to resist deformation during extrution, is wear resistant, and will not rust to contaminate the food product flowing therethrough. The confluence section 36 and reshaping section 48 may also be formed of stainless steel, but are preferably formed of high density polyethylene, which has a lower coefficient of friction and is easier to machine than stainless steel.

It is preferred that the container 16 be welded to the container closure plate 24, but that this assembly and the confluence section 36, reshaping section 48, reducer section 60, and extruder plate 70 all be joined by partable joining means such as bolts or screws, so that these sections may be readily disassembled for periodic inspection and cleaning, or where some unusual event occurs which might interrupt the flow of product through the channels. This detachable construction also allows the various sections to be machined more readily.

In the presently preferred embodiment, heating means is supplied in the apparatus 10 to heat the food mass flowing through the channels, to assist in maintaining the food product in a semi-liquid or slurried state, and thereby preventing the sticking of the food product within the channels. It is found that in some cases the food product need not be heated over the entire length of the apparatus 10, but instead it is sufficient to heat the food product over the length of the last three sections, the reshaping section 48, the reducer section 60 and the extruder plate 70. In other instances, heating over a greater length is needed, and the confluence section 36 is also heated, by a separate heating circuit.

Figure 3:
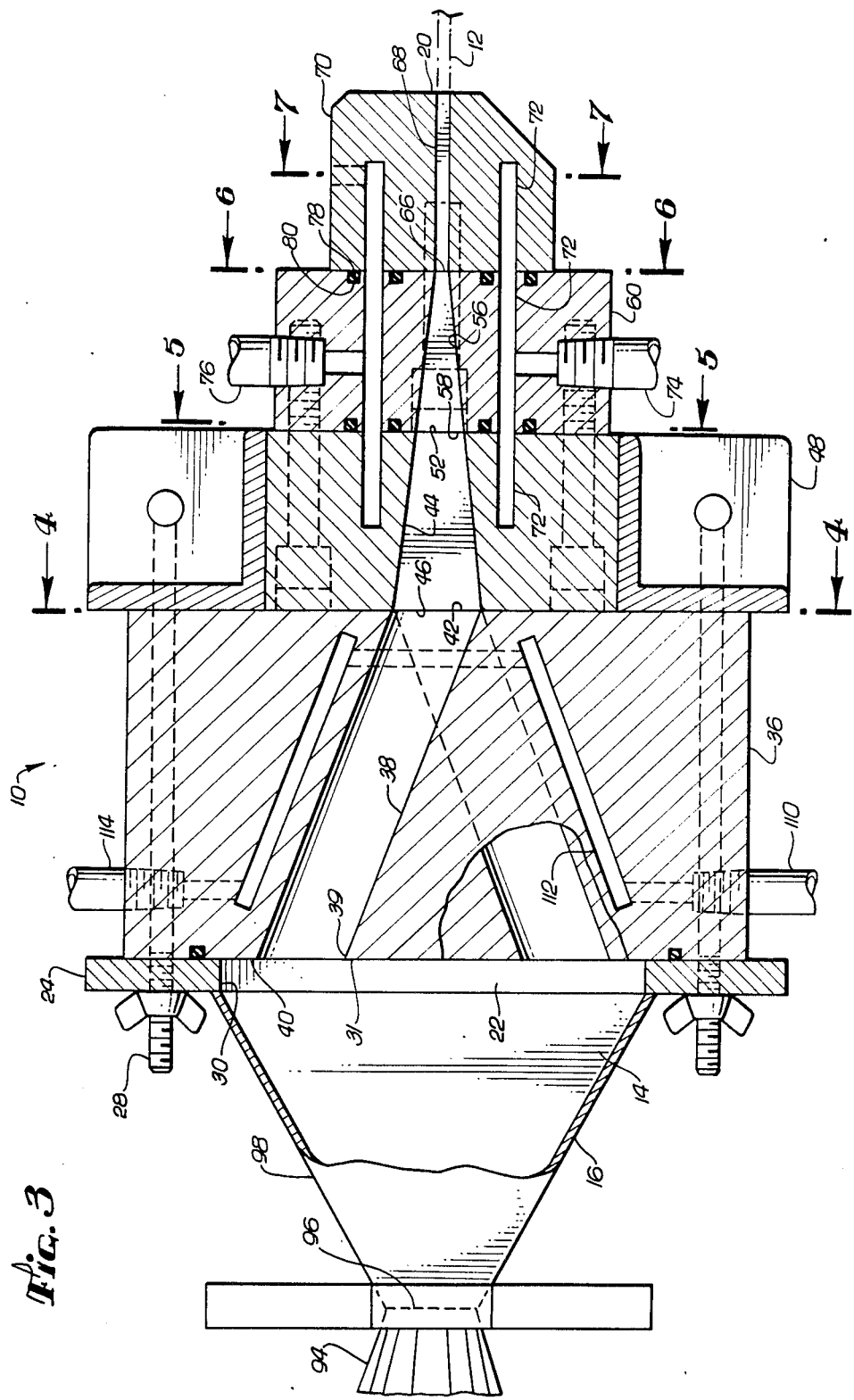
FIG. 3 is a side sectional view of the apparatus of FIG. 2, taken generally on line 3—3.

To accomplish heating of the last three sections, warm water is passed through passageways 72 in the reshaping section 48, the reducer section 60 and the extruder plate 70, the passageways 72 extending between these three sections 48, 60 and 70. As illustrated in FIG. 3, water flows into the reducer section 60 through an internally threaded water inlet 74, which is connected to an external source (not shown) of hot water. Water flows into the passageways 72 in the reducer section 60, and then into corresponding passageways 72 in the reshaping section 48 and the extruder plate 70. After circulating through the sections 48 and 70, to warm the product in the channels 44, 56 and 68, the water then flows back into the reducer section 60 and out of the apparatus 10 through a water outlet 76, which is also internally threaded to connect to a drain pipe (not shown). O-rings 78 are seated in O-ring grooves 80 to prevent water from leaking from the passageways 72 between the sections 48, 60 and 70. In extruding 16 streams of the meaty mixture described previously, at a linear extrusion rate of the stream 12 of 800 inches per minute, it is preferred that hot water of a temperature of about 160°-180° F. be circulated through the passageway 72 at a rate of about 2-3 gallons per minute.

In a similar fashion, hot water may be circulated through the confluence section 36 as necessary. Water is introduced into section 36 through a water inlet 110, flows through a passageway 112, and exits through a water outlet 114. The temperature and flow rate of the water flow are varied as needed. Typically, the higher the fat content of the food product 14, the more heating is required in both passageway 72 and passageway 112, to prevent hardening of the fat, which in turn could clog the apparatus 10.

The preferred apparatus of the present invention, having 16 extrusion channels, has been operated continuously for a period of 16 hours at an extrusion rate of 800 linear inches of product per minute, without any indication of plugging of the channels. During this period of time, the mass flow of food product in each channel was checked periodically, and was found to vary by less than about ±5% from channel to channel. By comparison, it has been found that an attempt to extrude a mass of meat product from a single container directly into a series of coplanar channels, to produce the same arrangement of extruded streams as produced at the extrusion emergence station 20 of the present invention, cannot be continued for more than a few minutes without plugging of at least some of the channels.

Thus, the present invention represents a significant advance in the art of extruding multiple streams of fiber-containing food products from a single food mass, where the streams are to be spaced more closely together than the average fiber length. The above-described preferred embodiment relates to a specific fibrous meat mass with required extruded product specifications, but the present invention is not so limited either to the food mass being extruded or to the specific dimensions of the extruded product. Although a particular embodiment of the invention has been described for purposes of illustration, various modifications may be made without departing from the spirit and scope of the invention. Accordingly, the invention is not to be limited except as by the appended claims.

I claim:

1. Apparatus for the simultaneous extrusion at an extrusion discharge station of at least two streams of a food product from a single mass of the food product, the food product having fibers therein with a greatest expected fiber length and an average fiber length, and the minimum desired product spacing between the streams at the extrusion discharge station being less than the greatest expected fiber length, the apparatus comprising:
   container means for containing the mass of the food product; and
   at least two extrusion channels communicating with said container means at a channel entry station, each of said channels having a spacing from all other channels at the channel entry station of greater than the average fiber length, said channels being convergently arranged so that the distance between the channels at the extrusion discharge station is the desired product spacing.

2. The apparatus of claim 1, wherein the number of channels is sixteen.

3. The apparatus of claim 1, wherein said container means comprises an inlet station, a convergence section, and a divergence section, said channel entry station communicating directly with said divergence section, whereby the food product mass is introduced into said container means at said inlet station, flows through said convergence section, flows through said divergence section, and enters said extrusion channels at said channel entry station.

4. The apparatus of claim 1, wherein said channels have cross-sectional areas which decrease with increasing distance from said channel entry station toward said extrusion discharge station.

5. The apparatus of claim 1, wherein said channels are tubes.

6. The apparatus of claim 1, wherein said channels are tubes having a substantially circular cross-section over at least a portion of their length.

7. The apparatus of claim 1, wherein said channels are tubes having a substantially rectangular cross-section at the extrusion discharge station.

8. The apparatus of claim 1, wherein the spacing of each of said channels from all other channels at the channel entry station is greater than the greatest expected fiber length.

9. The apparatus of claim 1, wherein said channels are externally heated to prevent sticking of the food product in said channels.

10. An extrusion apparatus for extruding a plurality of strips of a meat mixture from an extrusion discharge station, comprising:
   a container for holding the mass of the meat mixture, said container having an inlet port, a convergence section communicating with said inlet port, and a divergence section communicating with said convergence section at a pressure station; and
   a channel assembly having a plurality of extrusion channels therethrough, each extrusion channel communicating with said divergence section, wherein said extrusion channels are circular in cross section adjacent said divergence section and rectangular in cross section at the extrusion discharge station, and wherein the cross sectional area of each of said channels adjacent the divergence section is greater than the cross sectional area at the extrusion discharge station, and wherein the extrusion channels are coplanar at the extrusion discharge station so that the strips emerging from the extrusion discharge station are coplanar, said channel assembly including a heater chamber adjacent said channels, whereby a warm liquid may be circulated adjacent said channels to prevent the food mass from sticking in the channels.

11. The apparatus of claim 10, wherein the spacing of the channels adjacent the divergence section is greater than the average fiber length of the fibers in the meat mixture.

12. The apparatus of claim 10, wherein the channels are non-coplanar adjacent the divergence section.

13. The apparatus of claim 10, wherein the channels are arranged in two rows adjacent the divergence section.

* * * * *